United States Patent Office 2,772,998
Patented Dec. 4, 1956

2,772,998

CHOLINE SALT TABLET AND PROCESS OF MAKING SAME

Hermann Rudy, Heidelberg, Germany, assignor to Joh. A. Benckiser G. m. b. H. Chemische Fabrik, Ludwigshafen (Rhine), Germany, a corporation of Germany No Drawing. Application November 7, 1952,
Serial No. 319,417

9 Claims. (Cl. 167—82)

This invention relates to a process for tableting choline salts and to the formed tablets.

Choline salts, for example the chloride and the citrate, have recently found a wide range of application, especially in the therapeutical field and as an addition to the animal feed. From a practical viewpoint, the most advantageous form of application for such preparations, especially when used parenterally, is the tablet form, yet tablets can be formed therefrom only if they possess certain physical properties. The choline salts, for instance the chloride and the citrate, cannot readily be pressed or molded into tablets due to the fact that the dies of the tableting machine become smeared after a short time and must be cleaned very thoroughly, thereby causing a very frequent interruption of the tableting or forming process. Thus, it has been necessary heretofore to administer the choline salts for parenteral use in the form of capsules. Therefore, there has been a need to influence the physical characteristics of choline salts or to combine them with suitable substances in order that they may be formed into tablets in a commercially satisfactory manner.

In accordance with this invention, this problem was solved by mixing the choline salts, preferably after light drying at mild temperatures, with water free calcium citrate or with calcium citrate with low water content and with small quantities of a lubricant, as, for instance, talc. The water free calcium citrate or calcium citrate with low water content preferably contains between 0 and 15% water, and advantageously under 10% water. Such calcium citrates are at times referred to herein as dehydrated calcium citrate. If the ingredients are thoroughly mixed, they can be pressed without the slightest difficulty and without the dies becoming smeared, even after a run of many hours. It is surprising that choline salts and calcium citrate in admixture with one another and with a small amount of a mold lubricant can be tableted without difficulty.

While this invention is concerned primarily with choline citrate and choline chloride, which are the most important commercial choline salts for use as therapeutic and animal feed supplements, it will be understood that this invention may be applied to other choline salts which are likewise hygroscopic, such as choline borate and the like.

*Example*

| Ingredient: | Amount, kilos |
|---|---|
| Choline citrate | 100 |
| Calcium citrate (0–15% water) | 20 |
| Talc | 5 |

The calcium citrate and the choline citrate are thoroughly mixed and the mold lubricant, namely talc, is added; then the mixture is tableted on a conventional tableting machine in the usual manner. No difficulty is experienced in the tableting, and the machine may be run for many hours without interruption.

A composition wherein choline chloride replaces choline citrate may be formed into tablets in the same manner.

Calcium citrate is used herein to designate the compound having the empirical formula $$Ca_3(C_6H_5O_7)_2 \cdot 4H_2O$$

The foregoing description and example constitute illustrative embodiments of the invention and are not to be considered limitations thereupon, for the invention contemplates various adaptations, alterations and modifications which will occur to those skilled in the art and which are within the scope and spirit of the invention which is defined in the appended claims.

What is claimed is:

1. A process for tableting choline salts, comprising thoroughly mixing a hygroscopic choline salt with a minor quantity of calcium citrate containing less than 10% water and with talc, said calcium citrate and said talc being present in a quantity which renders the formed mixture substantially non-adherent to the tableting mold and said quantity of calcium citrate being about 20% of the weight of said salt, and tableting the formed mixture.

2. A process for tableting choline salts, comprising thoroughly mixing a hygroscopic choline salt with a smaller quantity of dehydrated calcium citrate and with a mold lubricant, said dehydrated calcium citrate and said mold lubricant being present in a quantity which renders the formed mixture substantially non-adherent to the tableting mold and tableting the formed mixture.

3. A process for tableting choline salts, comprising thoroughly mixing a hygroscopic choline salt previously subjected to partial drying at mild temperatures with a smaller quantity of calcium citrate containing less than 15% water and with a mold lubricant, said calcium citrate and said mold lubricant being present in quantity which renders the formed mixture substantially non-adherent to the tableting mold and said quantity of calcium citrate not exceeding 20% of the weight of said salt and tableting the formed mixture.

4. A choline tablet containing a hygroscopic choline salt having in intimate admixture therewith a lesser quantity of partially dehydrated calcium citrate and a mold lubricant, said calcium citrate and said mold lubricant being present at least in a quantity which renders the tablet substantially non-adherent to the tableting mold.

5. A choline citrate tablet containing choline citrate in intimate admixture with a lesser quantity of partially dehydrated calcium citrate and a mold lubricant, said calcium citrate and said mold lubricant being present at least in a quantity which renders the tablet substantially non-adherent to the tableting mold.

6. A choline chloride tablet containing choline chloride in intimate admixture with a lesser quantity of partially dehydrated calcium citrate and a mold lubricant, said calcium citrate and said mold lubricant being present at least in a quantity which renders the tablet substan- 7. A choline tablet containing a hygroscopic choline salt having in intimate admixture therewith calcium citrate containing less than 10% water and talc, said calcium citrate and said talc being present at least in a quantity which renders the tablet substantially non-adherent to the tableting mold.

8. A choline salt tablet containing a hygroscopic choline salt having in admixture therewith a lesser quantity of fully dehydrated calcium citrate and a mold lubricant, said calcium citrate and said mold lubricant being present at least in a quantity which renders the tablet substantially non-adherent to the tableting mold.

9. A choline cirate tablet containing choline citrate in admixture with a lesser quantity of fully dehydrated calcium citrate and talc, said calcium citrate and said talc being present at least in a quantity which renders the tablet substantially non-adherent to the tableting mold.

References Cited in the file of this patent

UNITED STATES PATENTS

| | | |
|---|---|---|
| 2,581,038 | Middendorf | Jan. 1, 1952 |
| 2,666,784 | Hopff et al. | Jan. 19, 1954 |

OTHER REFERENCES

Gehes Codex, 8th ed., 1953, Germany, p. 175.

Little et al., Text: Tablet Making, pages 48 and 63 (1949).